United States Patent [19]
Fournier et al.

[11] Patent Number: 5,286,968
[45] Date of Patent: Feb. 15, 1994

[54] METHOD AND DEVICE FOR MULTICHANNEL ANALOG DETECTION

[75] Inventors: Danièle Fournier; François Charbonnier; Philippe Gleyzes; Albert-Claude Boccara, all of Paris, France

[73] Assignee: Centre National de la Recherche Scientifique (CNRS), Paris, France

[21] Appl. No.: 834,226

[22] PCT Filed: Jun. 27, 1991

[86] PCT No.: PCT/FR91/00514
§ 371 Date: Mar. 10, 1992
§ 102(e) Date: Mar. 10, 1992

[87] PCT Pub. No.: WO92/00549
PCT Pub. Date: Jan. 9, 1992

[30] Foreign Application Priority Data
Jun. 29, 1990 [FR] France .................. 90 08255

[51] Int. Cl.⁵ ............................................. H01J 40/14
[52] U.S. Cl. ................... 250/208.1; 250/214 R
[58] Field of Search ............ 250/214 R, 208.1, 216, 250/234; 356/359, 351

[56] References Cited
U.S. PATENT DOCUMENTS

| | | | |
|---|---|---|---|
| 3,634,849 | 1/1975 | Nishizawa et al. | 250/214 R |
| 3,898,453 | 8/1975 | Javan | 250/214 R |
| 4,020,341 | 4/1977 | Javan | 250/214 R |
| 4,632,556 | 12/1986 | Akatsu | 356/359 |
| 4,732,483 | 3/1988 | Biegen | 356/351 |
| 4,869,593 | 9/1989 | Biegen | 356/359 |

FOREIGN PATENT DOCUMENTS
1582726  1/1981  United Kingdom .

OTHER PUBLICATIONS

"Quantitative Surface topography determination by Nomarski reflection microscopy. I. Theory", Lessor et al., Opt Soc. America, vol. 69, No. 2. pp. 357–366.

*Primary Examiner*—David C. Nelms
*Assistant Examiner*—S. B. Allen
*Attorney, Agent, or Firm*—Jacobson, Price, Holman & Stern

[57] ABSTRACT

The invention relates to a device for multichannel analog detection of a signal to be detected having a very good signal/noise ratio. It incorporates a modulator (53) producing a modulated signal S(P); means of synchronous attenuation (54) of variable phase $\Phi$ producing an attenuated modulated signal; a multipoint receiver (52) receiving the modulated-attenuated signal and producing for each point a primary analog signal; an integrator producing for each point a value $V(P,\Phi)$ resulting from the integration over N periods of the primary analog signal; means of reading, of digitizing and of storing the values $V(P,\Phi)$ for a given $\Phi$ value; a phase sequencer giving $\Phi$ the values $\Phi_0 + i2\pi/n$ successively where i is an integer varying from 1 to n; a digital processing unit making it possible to obtain data representative of S(P) from the values $V(P,\Phi)$. It is particularly well adapted to the detection of a luminous flux with an array of photodiodes.

13 Claims, 5 Drawing Sheets

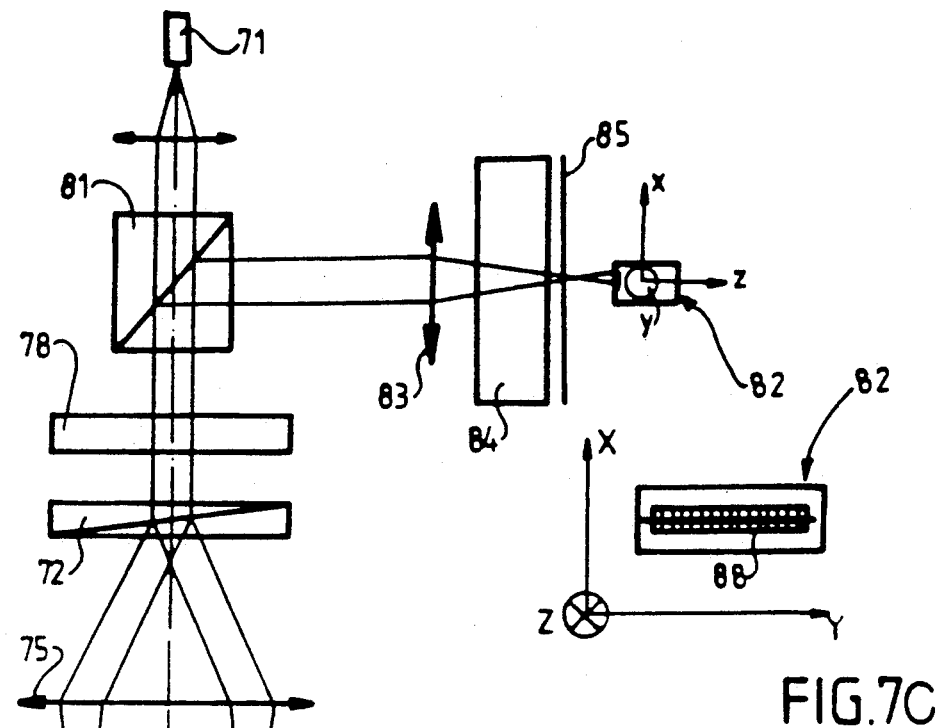
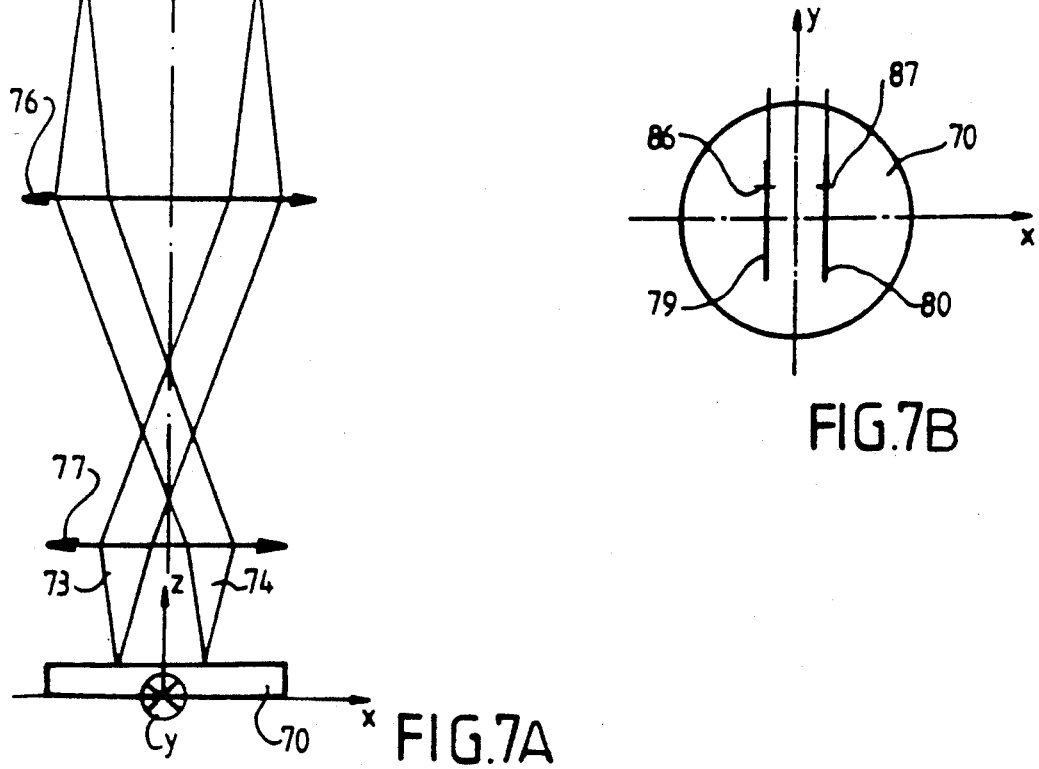
FIG.7C
FIG.7B
FIG.7A

METHOD AND DEVICE FOR MULTICHANNEL ANALOG DETECTION

The present invention relates to a method and a device for multichannel analog detection.

Multichannel detectors such as arrays or matrices of photodiodes are developing very rapidly and are now in current use.

The methods of detection frequently used with single-channel detectors in order to improve their signal/-noise ratio are often difficult to transpose directly to multichannel detectors. For this reason the development of a method and of a device for multichannel analog detection assumes great significance.

In particular, the method of synchronous detection is currently used with single-channel detectors. It gives complete satisfaction and its significance needs no further justification.

According to this method, which can be used equally well for spectrometers, dichrometers, polarimeters, ellipsometers, optical or scanning electron microscopes, interferential microscopes, etc., a source, most often a luminous source, is modulated. After detection, the modulated signal is amplified then multiplied by a reference whose mean value is zero. A low-pass filter followed by a DC amplifier makes it possible to obtain the information with a good noise rejection. A rejection rate of more than 90 decibels is thus frequently obtained.

Having regard to the significance of this method, an attempt has been made to transpose it for use in multichannel detectors.

To this end, a first solution consists in coupling as many synchronous detectors as there are elements in the multichannel detector. This solution requires the parallel reading of the specialized circuit and rapidly becomes impossible to employ for detectors comprising a large number of elements.

As an indication, multichannel detectors, which are currently widespread, are arrays or matrices of diodes incorporating from 256 to several million channels.

A second solution is to read each of the elements of the multichannel detector in series at a frequency which is higher than the modulation frequency, to digitize the information, to store it in various memories, and to process the signal thus derived using a programmed ADP device.

This solution is limited at present by the processing time of the digital memories and can only be employed with very low frequencies of modulation of the signal (a few Hertz). Moreover, the mean being found digitally, it is necessary to use analog-digital converters of very high resolution (greater than or equal to 12 bits) in order to obtain a good dynamic range and a reasonable speed of measurement. Such converters are very expensive.

Similar difficulties are encountered in the employment of heterodyne detections applied to the multichannel detectors.

The objective of the invention is thus to propose a method and a device for multichannel analog detection which are simple to employ, which improve the signal/-noise ratio of the measured signal and exhibit a good dynamic range.

To this end, there is proposed a method for multichannel analog detection of a signal to be detected in which:

- the signal to be detected is modulated, producing a modulated signal $S(P)$ of frequency f accompanied by noise;
- the modulated signal is subjected to a synchronous attenuation of phase $\Phi$ producing an attenuated modulated signal;
- the modulated-attenuated signal is received by a multipoint receiver which produces, for each point, a primary analog electrical signal;
- each primary analog signal is integrated over N periods producing, for each point P, a value $V(P,\Phi)$;
- the values $V(P,\Phi)$, for the set of points and for a fixed phase value $\Phi$, are read, digitized, stored;
- the phase $\Phi$ is successively increased $(n-1)$ time by $2\pi/n$, and for each of these values the operations which make it possible to store the values $V(P,\Phi)$ are repeated;
- the n values $V(P,\Phi)$ obtained respectively for each point P are digitally processed in such a way as to produce a data item representative of the amplitude and of the phase of $S(P)$.

The invention also relates to a device for multichannel analog detection of a signal to be detected comprising:

- a modulator producing a modulated signal $S(P)$;
- means of synchronous attenuation of variable phase $\Phi$ producing an attenuated modulated signal;
- a multipoint receiver receiving the modulated-attenuated signal and producing for each point a primary analog signal;
- an integrator producing for each point a value $V(P,\Phi)$ resulting from the integration over N periods of the primary analog signal;
- means of reading, of digitizing and of storing the values $V(P,\Phi)$ for a given $\Phi$ value;
- a phase sequencer giving $\Phi$ the values $\Phi_0 + i2\pi/n$ successively where i is an integer varying from 1 to n;
- a digital processing unit making it possible to obtain data representative of $S(P)$ from the values $V(P,\Phi)$.

The invention will be described in more detail with reference to the attached Figures in which:

FIGS. 7A, 7B and 7C are a diagram of a device for microscopy in polarized light with which the detection device of the invention is used.

Figure 1:
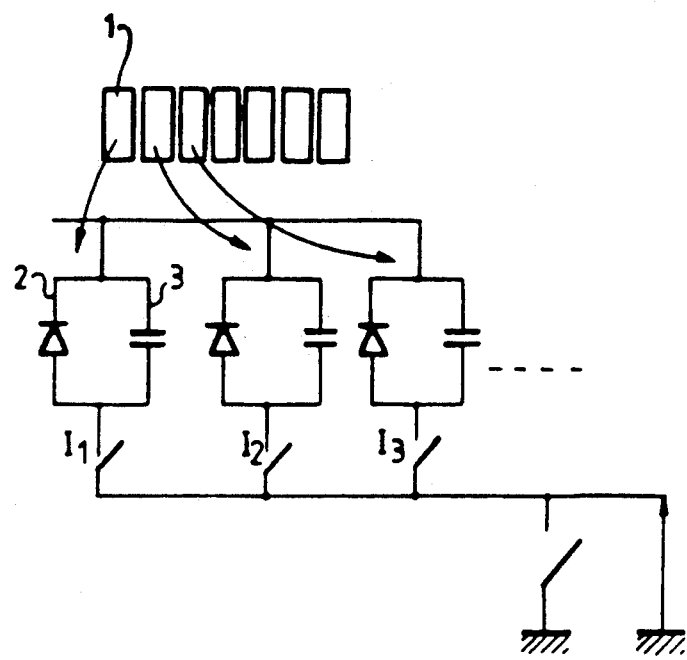
FIG. 1 is a schematic representation of a multipoint receiver used according to the invention.

The method and the device for multichannel analog detection of the invention can be used in a very general way for the detection of numerous types of signals. However, they are particularly well adapted to the carrying out of measurements of luminous flux with photodiodes in the form of arrays or matrices.

It is known per se that in such a detector, each photodiode 1 is equivalent to the mounting in parallel of a diode 2 and of a capacitor 3. The current delivered to this circuit is a function of the luminous flux received by the photodiode 1. A controllable switch $I_1$ makes it possible to read the charge of the capacitor 3 at the chosen instant and thus to measure the luminous energy received between two readings, that is to say the integral of the flux.

The arrays or matrices of photodiodes incorporate a very large number of elements of this type varying according to the applications envisaged from 256 to several million elements. An adapted device makes it possible to successively control switches $I_1, I_2, I_3 \ldots, I_i \ldots$ in such a way as to make it possible to acquire signals which are representative of the respective energies $E_1, E_2, E_3, \ldots, E_i, \ldots$ received by the corresponding photodiodes.

Generally, the signal to be detected is modulated in such a way as to obtain a modulated signal S(P) of frequency f and of period T. This signal is, needless to say, accompanied by noise.

This modulation frequency f can be relatively high, for example several hundreds of MHz since, as will be seen in what follows, the frequency of reading of the data delivered by the multipoint receiver and digitizing of these data is greatly reduced with respect to the frequency f.

In certain particular cases, the physical phenomenon observed directly produces a periodic signal in the frequency range f indicated above and can be directly exploited. Most often, the signal to be detected is first of all deliberately modulated as for the application according to the known principles of synchronous detection for a single detector or of heterodyne detection. This modulation can be obtained by numerous devices. When the signal to be detected is a luminous signal carried by a beam produced by a luminous source, it is possible to directly modulate the supply of the source in order to obtain the modulated signal. It is equally possible to use a means of modulation interposed between the source and the multipoint receiver, for example a POCHELS module, mechanical modulator, elasto-optical modulator, rotating polarizer, etc.

The modulated signal S(P) represented for example in FIG. 2 is next subjected to a synchronous attenuation of phase $\Phi$ represented by $A(\Phi)$ in such a way as to produce an attenuated modulated signal. This attenuation signal $A(\Phi)$ is a periodic signal of the same frequency f as the modulated signal S(P) and it is possible to vary its phase s determining its phase-shift with respect to S(P). While fulfilling these conditions, it can assume variable forms, can be constituted by a succession of square waves, can itself be sinusoidal, etc.

Figure 3:
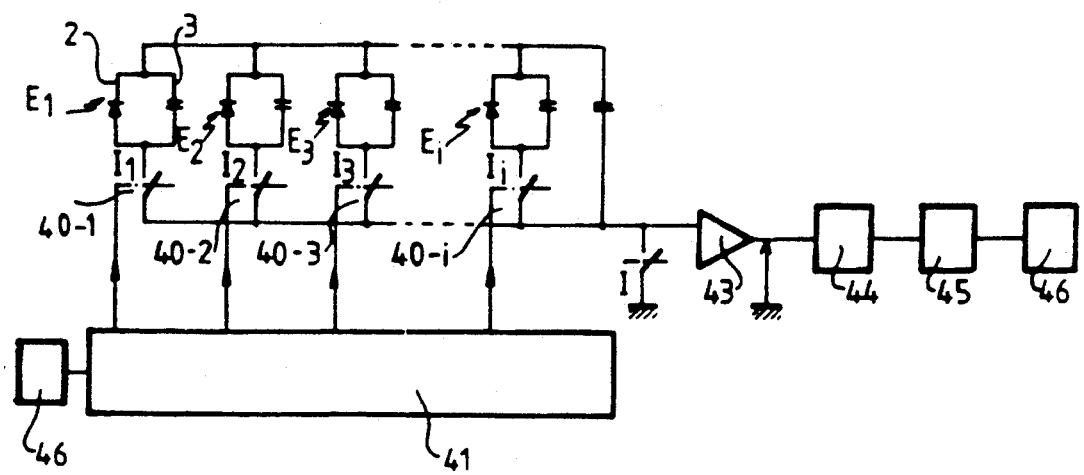
FIG. 3 is an overall representation of the detection device according to the invention.
Figure 2A:
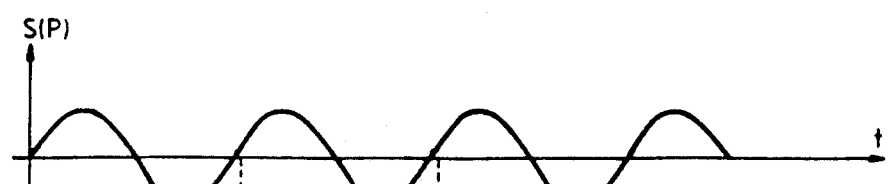
FIGS. 2A-2E are time diagrams of the method of detection according to the invention.
Figure 2B:
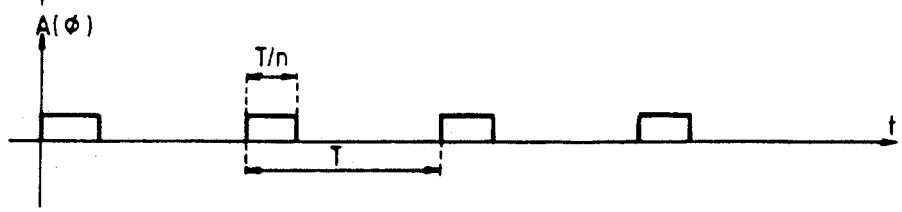
Figure 2C:
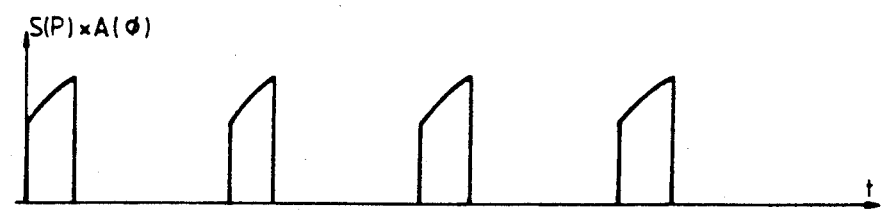
Figure 2D:
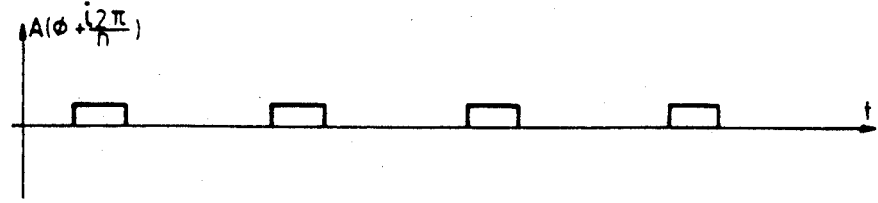
Figure 2E:
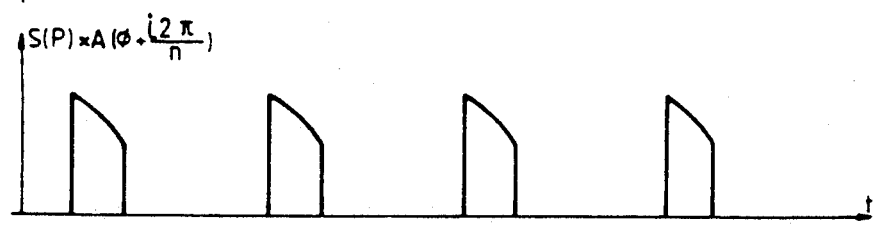

The description which will follow, with reference to FIGS. 2 and 3, relates to the case of a function $A(\Phi)$ of square waves.

This function $A(\Phi)$ has the value 1 during a fraction 1/n of the period and a zero value otherwise. The attenuated modulated signal $S(P) \times A(\Phi)$ thus corresponds to a chopping of a fraction 1/n of each period of the signal S(P), with constant phase (on FIG. 2, n=4).

The luminous signal thus modulated and attenuated is addressed to the multipoint receiver which converts, for each of the points, the luminous signal received into a primary analog electrical signal of the same form.

This primary analog electrical signal is integrated over N periods and produces a value $V(P,\Phi)$.

For each point P, the value $V(P,\Phi)$ is thus produced by the luminous flux received by the detector at this point during N periods of the signal S(P).

The values $V(P,\Phi)$ for the set of points, for a fixed phase value $\Phi$, are then read, digitized and stored. These operations of reading, digitizing, and storing are thus carried out at the frequency f/N.

After having carried out these operations for a given $\Phi$ value, this phase $\Phi$ of the synchronous attenuation $A(\Phi)$ is increased with respect to the modulated signal S(P) by $2\pi/n$.

A new chopping of the signal S(P) is then produced corresponding to the time interval of $2\pi/n$ following the interval previously chopped.

In the same way, the attenuated modulated signal is received by the multipoint receiver which produces for each point a primary analog electrical signal. This new primary analog signal is then also integrated over N periods and produces for each point a value $V(P,\Phi)$ corresponding to the new value of $\Phi$. These new values $V(P,\Phi)$ are again read, digitized and stored.

The phase $\Phi$ is successively increased by $2\pi/n$ thus storing n sets of values $V(P,\Phi)$.

It is important to emphasize that in these operations, the reading and the digitizing of the values $V(P,\Phi)$ have been produced at the frequency f/N, thus at a frequency which can be much lower than the frequency f. It is thus possible, as has been indicated above, to dissociate the modulation frequency of the signal to be detected f from the frequency of reading and of digitizing of the signals delivered by the multipoint receiver. This feature makes it possible to considerably improve the signal/noise ratio of the detection and also makes it possible to employ a method of heterodyne detection with any multipoint detector and in particular with detectors of luminous flux of the CCD type.

When the multipoint receiver is composed of CCD elements, the integration of the primary analog signal is obtained directly at the level of each photodiode. The reading of the values $V(P,\Phi)$ for each value of the phase shift $\Phi$ is obtained by the action of a shift register 41 which controls the switches 40-1, 40-2, ..., 40-i, ... and produces a signal on the video line 42. After amplification by the amplifier 43, the video signal carrying the informations $V(P,\Phi)$ is digitized by the analog-digital converter 44 and stored in an ADP device 45.

A clock 46 ensures synchronization of the attenuation with the modulated signal and controls the reading of the values $V(P,\Phi)$.

Thus, a value $V(P,\Phi)$ has been stored for each of the points P. In a way known per se, the processing unit 46 processes these n values in such a way as to produce data which are representative of the amplitude and of the phase of the signal S(P).

These values are then available for any purpose, they can be displayed on a screen, represented with the aid of a plotter, control any device, etc.

The above description has been given with reference to the use of an attenuation represented by a square-wave function, any other positive periodic function can be used to this effect so long as n sets of values $V(P,\Phi)$ are produced for values $\Phi$ of the phase shift of the attenuation with respect to the modulated signal varying by $2\pi/n$.

In FIG. 2, n=4. Higher values of n make it possible to measure harmonics of the signal at a frequency which is a multiple of f.

Figure 4:
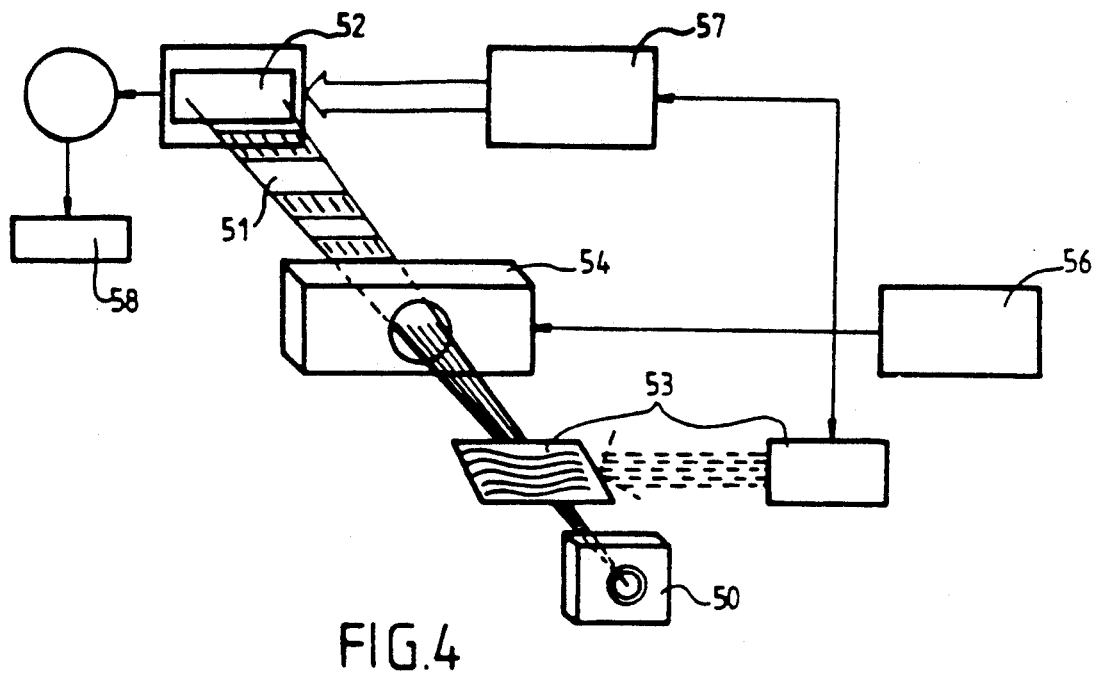
FIG. 4 represents the detection device of the invention in a first example of an application.
Figure 5:
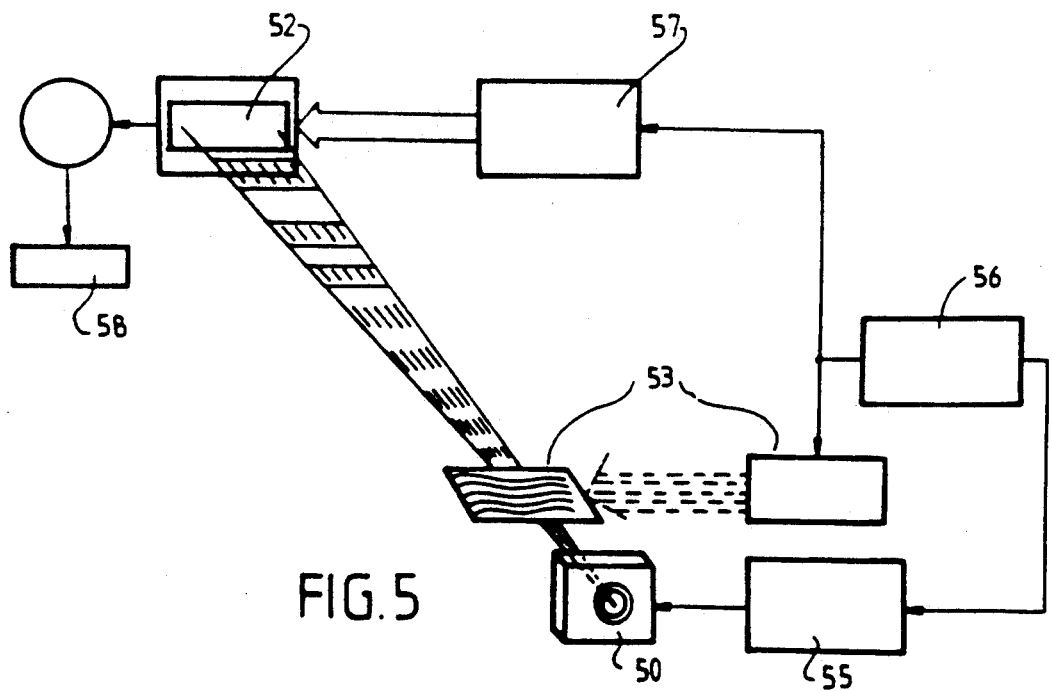
FIG. 5 represents a second example of an application of the detection device according to the invention.

FIGS. 4 and 5 are two representations of a detection device employing the invention. A luminous source 50 is used for the observation of a physical phenomenon giving rise to a signal to be detected. The luminous beam 51 produced by this source is detected by a multipoint detector 52, constituted for example by a CCD (charge coupled device) array of photodiodes. Between the source 50 and the multipoint receiver 52 are placed means of modulation 53 of the luminous beam.

In the example of embodiment presented in FIG. 4, the attenuation is produced by the shutter 54 while in the example represented in FIG. 5, the attenuation is produced by acting on the supply 55 of the luminous source 50. In the two embodiments, the means of modulation 53 and the means of attenuation 54 or 55 are controlled by the same clock 56 which ensures their synchronization. This same clock 56 guides, by the agency of the driver module 57, the reading of the array of diodes 52. The video signal carrying the values $V(P,\Phi)$ for each value of the phase shift $\Phi$ is addressed to the processing unit 58.

Figure 6:
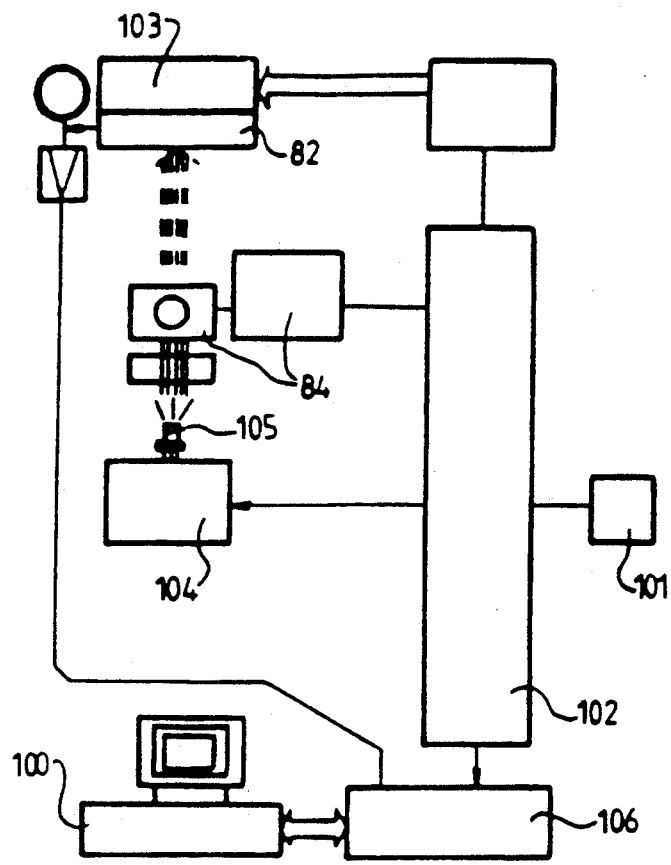
FIG. 6 is a detailed schematic view of the detection device of the invention.

The application of the detection method of the invention for the measurement of roughness by interferential microscopy will now be described with reference to FIGS. 6, 7 and 8.

FIG. 7A is the general optical diagram, FIGS. 7B and 7C are representations of the object 70 and of the multipoint detector in their plane.

The object 70 whose roughness is measured is a reflector. The source 71 produces, after crossing a WOLLASTON prism 72, two beams 73 and 74 polarized perpendicularly and focused by the effect of the ocular 75, of the tube lens 76 and of the objective 77 onto the object 70. A cylindrical lens 78 deforms the beams in such a way that they focus along lines 79 and 80.

A separator cube 81 steers the reflected beams towards the multipoint receiver 82 constituted by an array of CCD photodiodes. A lens 83 brings about the focusing of the beams on the receiver, an elasto-optic modulator 84 modulates the phase difference between the two beams and a polarizer 85 produces their interference.

Thus, for each pair of points of the lines 79 and 80 and of the object 70, the phase difference between the reflected beams depends on the path difference introduced at the measurement points, that is to say on their relative positions with respect to a plane which is normal to the beam.

The signal received at the point 88 of the receiver 82 corresponding to the points 86, 87 (the points 86, 87 and 88 are optically conjugated) depends on the phase difference between the beams and thus on the relative positions of the points 86, 87 with respect to the plane which is normal to the beam. The set of signals received at the different points of the detector 82 makes possible the measurement of the roughness of the object 70 along lines 79, 80. By moving the object 70, perpendicularly to these lines, the whole of its surface is scanned.

The microcomputer 100 drives the measurement, keeps the values $V(P,\Phi)$ delivered by the multipoint detector 82 in the memory and produces the measured values which are representative of S(P).

The clock 101 controls and synchronizes, via the agency of the block 102 for shaping and for processing the modulation signal, the attenuation and the reading of the CCD register 103 associated with the array of photodiodes 82.

The modulation is produced by the control of the modulator 84 at the frequency of 50 KHz.

The attenuation is produced by the control of the supply 104 of the source 105 by the block 102. The attenuation signal is composed of two periodic signals offset by $\pi$ sent sequentially to the input of the supply 104 ($A(\Phi)$ is a square-wave function, $n=2$).

The reading of the CCD register 103 is done for each phase of the attenuation signal after storage of several exposures, for example 1000 ($n=1000$). The reading is thus done at 50 Hz.

The video signal produced by the reading of the CCD register 103 is addressed to the analog-digital converter 106 and the values read stored in the microcomputer 100.

The latter, producing the difference between the values obtained during two readings for attenuations in phase opposition, extracts, for each point of the detector, the amplitude of the signal.

Figure 8:
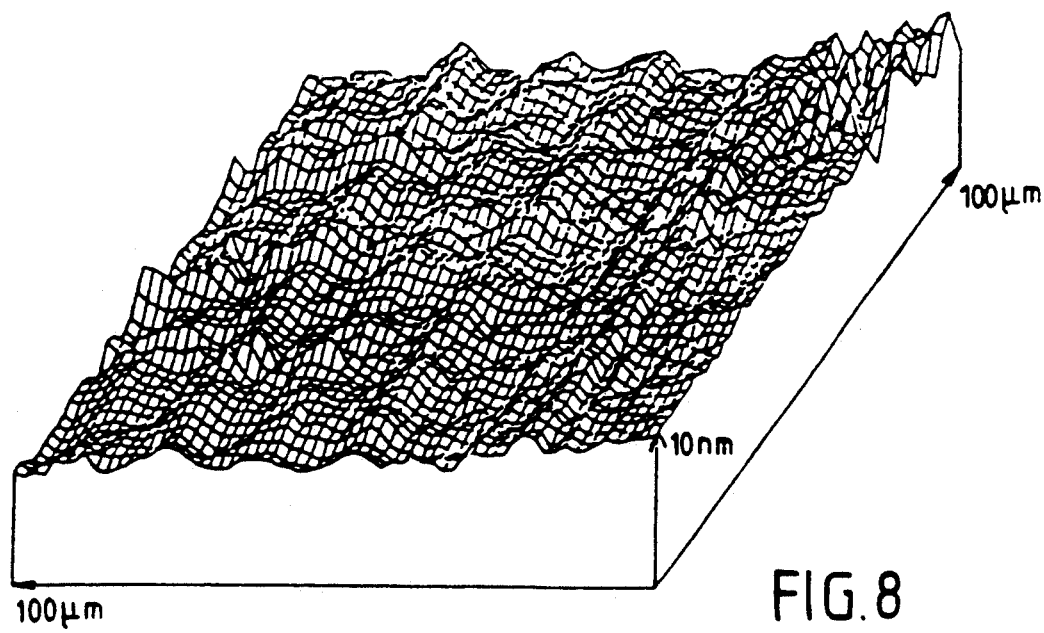
FIG. 8 is an example of an image obtained with devices of FIGS. 7 and 8.

FIG. 8 is an example of a display of the roughness of a sample obtained with the device described.

The method and the device for multichannel detection described can be applied in numerous fields. In particular, they can be used in spectrometers, dichrometers, polarimeters, ellipsometers, optical and scanning electron microscopes etc.

What is claimed is:

1. Method for multichannel analog detection of a signal to be detected in which:
    the signal to be detected is modulated, producing a modulated signal S(P) of frequency (f) accompanied by noise;
    the modulated signal is subjected to a synchronous attenuation of phase $\Phi$ producing an attenuated modulated signal;
    the modulated-attenuated signal is received by a multipoint receiver which produces, for each point, a primary analog electrical signal;
    each primary analog signal is integrated over N periods producing, for each point (P), a value $V(P,\Phi)$;
    the values $V(P,\Phi)$, for the set of points and for a fixed phase value $\Phi$, are read, digitized, stored;
    the phase $\Phi$ is successively increased $(n-1)$ times by $2\pi/n$, and for each of these values the operations which make it possible to store the values $V(P,\Phi)$ are repeated;
    the n values $V(P,\Phi)$ obtained respectively for each point (P) are digitally processed in such a way as to produce a data item representative of the amplitude and of the phase of S(P).

2. Method of multichannel analog detection according to claim 1, characterized in that the phase $\Phi$ is increased successively by $\pi/2(n=4)$.

3. Method of multichannel analog detection according to claim 1, characterized in that the synchronous attenuation is produced by the multiplication of the modulated signal by a square-wave function successively taking the values 0 and 1.

4. Method of multichannel analog detection according to claim 1, characterized in that the signal to be detected is a luminous signal.

5. Method of multichannel analog detection according to claim 4, characterized in that the modulation of the signal to be detected is obtained by modulation of the luminous source.

6. Method of multichannel analog detection according to claim 1, characterized in that the primary analog electrical signal, for each point, is obtained by heterodyne detection.

7. Device for multichannel analog detection of a signal to be detected comprising:
    a modulator (53) producing a modulated signal S(P);

means of synchronous attenuation (54) of variable phase $\Phi$ producing an attenuated modulated signal;

a multipoint receiver (52) receiving the modulated-attenuated signal and producing for each point a primary analog signal;

an integrator producing for each point a value $V(P,\Phi)$ resulting from the integration over N periods of the primary analog signal;

means of reading, of digitizing and of storing the values $V(P,\Phi)$ for a given $\Phi$ value;

a phase sequencer giving $\Phi$ the values $\Phi_0+i2\pi/n$ successively where i is an integer varying from 1 to n;

a digital processing unit making it possible to obtain data representative of S(P) from the values $V(P,\Phi)$.

8. Device for multichannel analog detection according to claim 7, characterized in that:

the signal to be detected is a luminous signal carried by a beam produced by a luminous source;

it incorporates photodiodes (CCD) constituting the multipoint receiver and the integrator.

9. Device for multichannel analog detection according to claim 8, characterized in that the luminous source is a laser diode incorporating a supply and in that the means of synchronous attenuation acts on the supply of the source.

10. Device for multichannel analog detection according to claim 8, characterized in that the means of synchronous attenuation are a shutter placed between the luminous source and the multipoint receiver.

11. Device for multichannel analog detection according to claim 7, characterized in that it incorporates means of heterodyne detection making it possible to improve the signal/noise ratio of the primary analog electrical signal produced for each point by the multipoint receiver.

12. Device for multichannel analog detection according to claim 7, characterized in that the means of reading of the values $V(P,\Phi)$ produce a signal of the video type and address it to the means of digitizing.

13. Device for multichannel analog detection according to claim 7, characterized in that it is used to carry out measurements of difference in path length by interferential microscopy in polarized light.

* * * * *